March 13, 1928. 1,662,533
C. L. MERRIMAN
MEASURING SCALE FOR TRANSPARENT LIQUID CONTAINERS
Filed March 8, 1926 3 Sheets-Sheet 1
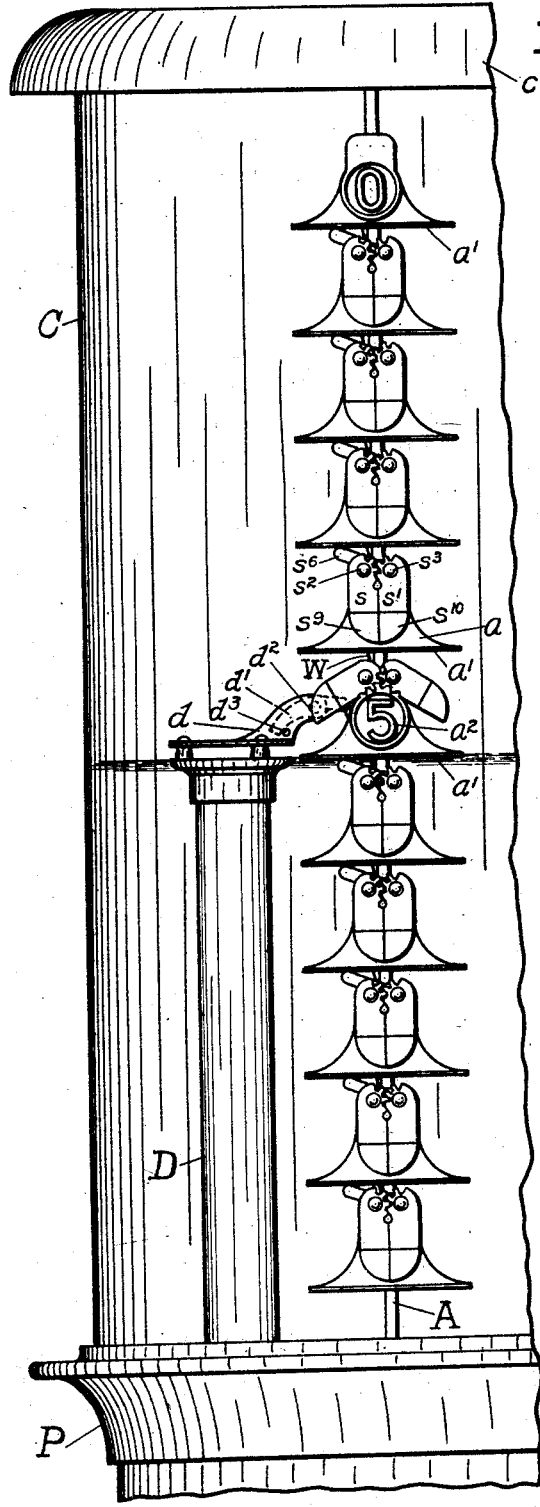
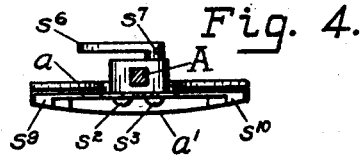
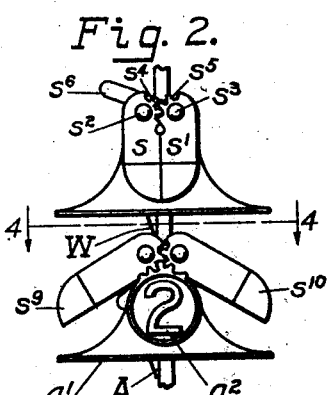
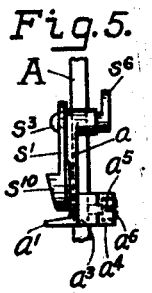
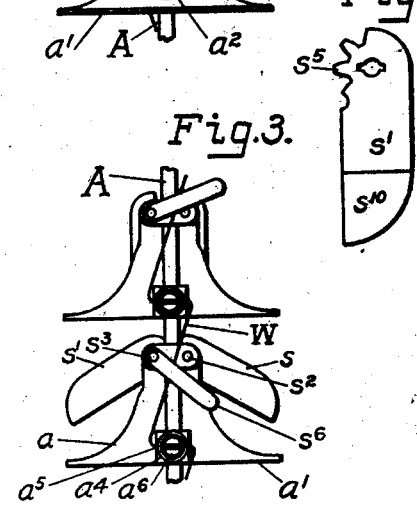
INVENTOR.
Carroll L. Merriman
BY Walter A. Knight
ATTORNEY.

March 13, 1928. 1,662,533
C. L. MERRIMAN
MEASURING SCALE FOR TRANSPARENT LIQUID CONTAINERS
Filed March 8, 1926 3 Sheets-Sheet 2
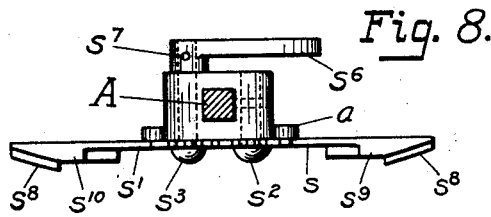
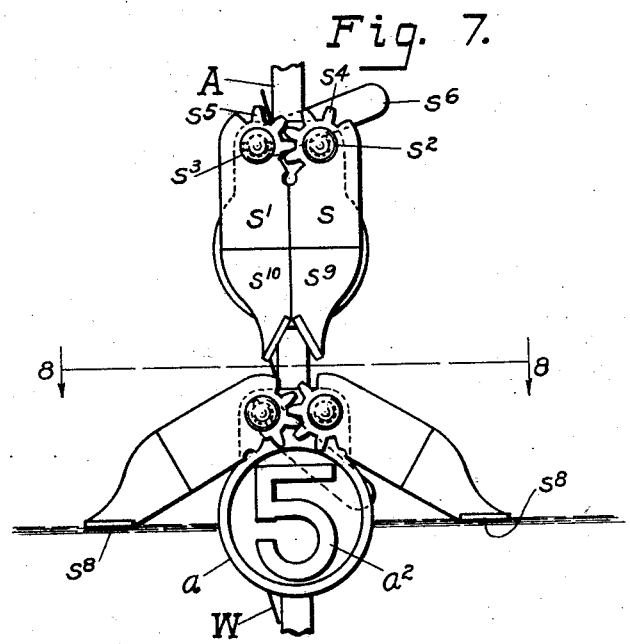
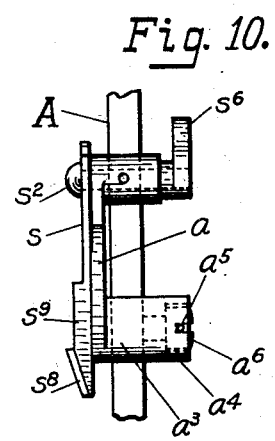
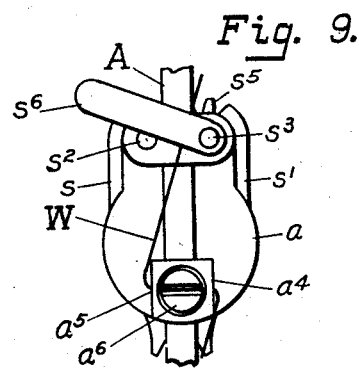
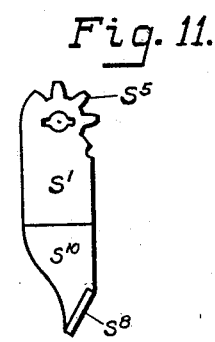
INVENTOR.
Carroll L. Merriman
BY Walter A. Knight
ATTORNEY.

March 13, 1928.  1,662,533
C. L. MERRIMAN
MEASURING SCALE FOR TRANSPARENT LIQUID CONTAINERS
Filed March 8, 1926   3 Sheets-Sheet 3
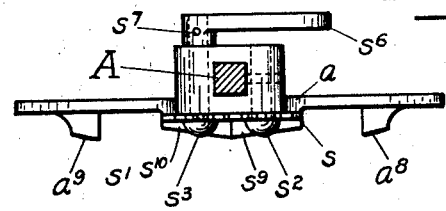
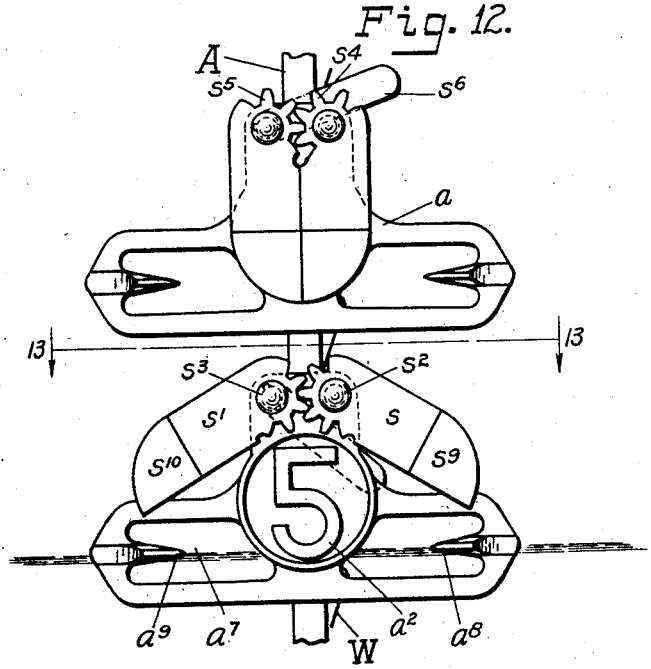
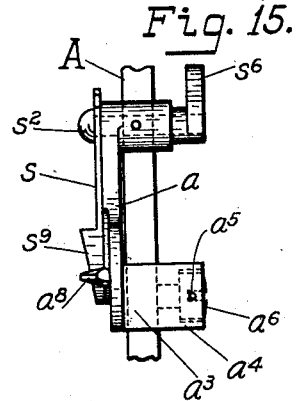
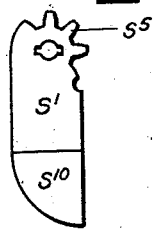
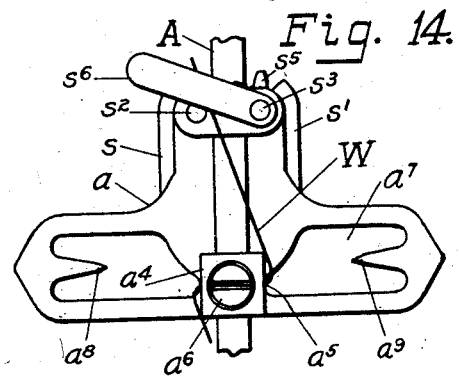
INVENTOR.
Carroll L. Merriman
BY Walter A. Knight
ATTORNEY.

Patented Mar. 13, 1928.

1,662,533

UNITED STATES PATENT OFFICE.

CARROLL L. MERRIMAN, OF FORT WAYNE, INDIANA, ASSIGNOR TO WAYNE COMPANY, OF FORT WAYNE, INDIANA, A CORPORATION OF INDIANA.

MEASURING SCALE FOR TRANSPARENT LIQUID CONTAINERS.

Application filed March 8, 1926. Serial No. 93,182.

My invention relates to measuring scales for transparent liquid containers. The device is adapted to be secured to the casing on the inside of a transparent liquid container, from which the liquid is to be dispensed and measured as delivered so that the customer can plainly see for himself what quantity he has received. Such devices are used principally on so-called visible dispensing apparatus for handling gasoline.

One object of my invention is to provide such a measuring scale with a vertically adjustable tab for each of the indicating numbers, means for holding said tabs securely in adjusted position on the rod on which they are mounted, and means for sealing said tabs in said adjusted position.

The principal object of my invention is to keep all the numbers on the several tabs concealed except the one which indicates the quantity of liquid then being dispensed.

Another object of my invention is to provide improved means, easily readable by the purchaser of liquid, for knowing the quantity of liquid which the apparatus is then set to deliver.

In the particular embodiment of my invention selected for illustration and shown in the accompanying drawings:—

Figure 1 is a front elevation of part of a so-called visible dispensing apparatus showing part of the transparent container, with my invention in preferred form secured therein ready for use, and with the number "5" exposed showing that five gallons of liquid are to be dispensed at that setting of the apparatus, Fig. 2 is a front elevation of a part of the rod, with two number tabs mounted thereon, the upper one with shutters closed and the lower with shutters open, Fig. 3 is a rear elevation of the same, Fig. 4 is a cross section on the line 4—4 of Fig. 2, Fig. 5 is a side elevation of the upper tab and attendant parts of Fig. 2, Fig. 6, a detail, is a front elevation of the motivating shutter, Fig. 7 shows a modified form of my invention with a section of the rod and two tabs mounted thereon, the shutter for the upper closed and the shutter for the lower open, their outstretched ends of the latter marking the proper level of the liquid when five gallons of liquid have been dispensed from the apparatus, Fig. 8 is a section on the line 8—8 of Fig. 7, Fig. 9 is a rear elevation of the upper tab and attendant parts of Fig. 7, Fig. 10 is a side elevation of the same, Fig. 11 is a front elevation of the motivating shutter, Fig. 12 shows another modified form of my invention with a section of the rod and two tabs mounted thereon, the shutters for the upper tab closed and those for the lower open, with another means for noting the level of the liquid when drawn to a predetermined level, Fig. 13 is a section on the line 13—13 of Fig. 12, Fig. 14 is a rear elevation of the upper tab and attendant parts of Fig. 12, Fig. 15 is a side elevation of the same, and Fig. 16 is a front elevation of the motivating shutter.

Referring now to the drawings and particularly to Figures 1 to 6 inclusive, illustrating the preferred form of the device, C is a transparent cylindrical container for the gasoline to be dispensed, mounted on the top of a pedestal P, and surmounted by a cap $c$. A vertically adjustable delivery tube D extends from below up into the container C, and when this tube is lowered to the point desired the liquid in the container C is drained to that level through the pipe D and its connection to the customer's car tank or other receptacle.

To a vertically positioned rod A, fixed within the container C, are adjustably secured any suitable number of tabs $a$, each bearing on its face a number $a^2$, these tabs placed in the numerical order of those numbers, beginning at the top, and the tabs are adjusted so that their bottom or gauge edges $a^1$ will correctly indicate a unit of measure or multiple thereof.

The gauge edge $a^1$ is made in the form of an arc to bring it in close proximity to the container C (see Fig. 4).

By other means not shown, the height of the liquid in the container C is caused to stand at the level of the gauge edge $a^1$ of the top-most or "0" tab, when the apparatus is ready to have serving liquid therefrom begun.

Shutters $s$, $s^1$, pivoted at $s^2$, $s^3$, respectively, near their tops, to the upper part of the tab $a$, have intermeshing geared corners $s^4$, $s^5$, respectively. A lever $s^6$ is fixed by the pins $s^7$ to the back of the key-pivot $s^3$, the shutter $s^1$ being rotatively engaged by the front end of said key-pivot, so that when the outer end of the lever $s^6$ is depressed as shown in Fig. 1 at "5" and Figs. 2 and 3 at the bottom, the shutter $s^1$ is raised by the action of the lever through the key-pivot, and the shutter $s$ is similarly raised by the action of the gear teeth $s^5$ on the gear teeth $s^4$. The shutters $s$, $s^1$, are weighted at their ends $s^9$, $s^{10}$, respectively, to ensure complete and prompt closing of said shutters.

The delivery tube D has fixed to its top a bracket $d$ having a finger $d^1$ pivoted to said bracket at $d^2$. Upward pressure of the outer end of said finger as upon contact with one of the levers $s^6$, presses the inner end of said finger against the pin $d^3$, which arrests its motion on its pivot $d^2$. Upward pressure on the outer end of said finger $d^1$ causes said outer end to be depressed until said finger ceases to contact with the levers $s^6$ as when the tube D is raised.

Each tab $a$ may be held in adjusted position by a set screw $a^6$, and secured against mal-adjustment by a single sealing wire W, passed through holes $a^5$ so formed through a boss $a^4$ on the guide lug $a^3$ on the back of the tab $a$, as to cause said wire to lie in the slot of the setting screw $a^6$. Obviously a separate seal and wire can be used for each setting screw.

Referring now to Figs. 7 to 11 inclusive; this modification of the device is in every respect similar to the preferred form, except that the gauge $a^1$ is omitted and gauge edges $s^8$ are provided on the outer ends of the shutters $s$, $s^1$. The outer faces of these gauge edges $s^8$ are beveled or curved to bring them close to the container C.

Referring now to Figs. 12 to 16 inclusive; this modification of the device is in every respect similar to the preferred form, except that the gauge edge $a^1$ is omitted and the lower part of the tab $a$ is enlarged so that a window $a^7$ may be formed therein with oppositely positioned gauge pointers $a^8$, $a^9$, extending into said window. The outer edges of these pointers extend outwardly nearly to the container C.

It will be understood that the shutter opening finger might be fixed to the overflow pipe of a dispensing apparatus having the adjustable tube on the fill side instead of the discharge side.

I do not desire to be limited to the precise forms of my invention shown herein but conceive as within the scope of my invention every form thereof readable upon the claims.

I claim as my invention and desire to secure by Letters Patent of the United States:—

1. A scale for transparent liquid containers, comprising a setting bar fixed in a vertical position within said container, an adjustable tab mounted on said bar, means for fixing the position of said tab on said bar, there being a suitable numeral on the front side of said tab, means for normally keeping said numeral covered and mechanical means within said container for temporarily adjusting said covering means so as to expose said numeral to view.

2. In combination with a transparent container of a liquid dispensing apparatus, said container having a setting bar vertically positioned therein, and tabs adjustably mounted on said bar, there being a suitable numeral on each tab; normally self-closing shutters for each tab to hide its numeral from view and means for temporarily holding the shutters of any one of said tabs open.

3. In combination with a transparent container of a liquid measuring and dispensing apparatus having a vertically adjustable element in said container; a setting bar fixed in a vertical position within said container, a plurality of vertically adjustable tabs mounted on said bar, means for fixing each tab in its adjusted position on said bar, a suitable numeral on the front side of each tab, shutter means for each tab for normally keeping its numeral covered, and means secured to said vertically adjustable element for temporarily moving each one but one only at a time of said shutter means so as to expose the numeral it covers.

4. In combination with a liquid dispensing apparatus, a container having a setting bar vertically positioned therein, a plurality of tabs adjustably mounted on said bar, a suitable numeral on each tab, means on said bar for maintaining said tabs in a fixed position, for each tab a pair of shutters each member of which is pivoted to said tab at the top thereof, means for keeping said shutters normally closed concealing the numerals on said tabs, the members of each pair of shutters gear-connected, a key-pivot rotatively engaged with one member of each pair of shutters, a lever fastened to said key-pivot, a vertically adjustable delivery tube within said container and means carried by said tube for contacting with said lever to open said shutters.

In testimony whereof I have hereunto set my hand.

CARROLL L. MERRIMAN.